United States Patent
Speros et al.

[11] 3,882,343
[45] May 6, 1975

[54] TIN CHLORIDE MOLECULAR RADIATION LAMP

[75] Inventors: Dimitrios M. Speros, Painesville; Robert M. Caldwell, Richmond Hts.; Robert H. Springer, Warrensville Hts.; Robert P. Taylor, Euclid, all of Ohio

[73] Assignee: General Electric Company, Schenectady, N.Y.

[22] Filed: Oct. 6, 1970

[21] Appl. No.: 78,484

[52] U.S. Cl. ............................................. 313/229
[51] Int. Cl. ........................................... H01j 61/18
[58] Field of Search.................... 313/184, 229, 225

[56] References Cited
UNITED STATES PATENTS
| | | | |
|---|---|---|---|
| 3,279,877 | 10/1966 | Smith et al................... | 313/184 UX |
| 3,566,178 | 2/1971 | Mori et al........................... | 313/229 |
| 3,586,898 | 6/1971 | Speros et al........................ | 313/229 |

Primary Examiner—Palmer C. Demeo
Attorney, Agent, or Firm—Ernest W. Legree; Henry P. Truesdell; Frank L. Neuhauser

[57] ABSTRACT

A molecular radiation lamp containing stannous chloride $SnCl_2$, stannous iodide $SnI_2$, and excess tin to give thermodynamic stability against attack of the tungsten electrodes by chlorine. The lamp also contains mercury for a buffer gas and an inert gas to facilitate starting. It has been found that a first oxyhalide cycle is responsible for electrode attack and a second oxyhalide cycle is responsible for wall cleanup. For clean walls and long life, the residual oxygen level in the lamp should be reduced to the point where not enough remains for excessive electrode attack through the first oxyhalide cycle but sufficient remains for operation of the second oxyhalide cycle.

10 Claims, 4 Drawing Figures

PATENTED MAY 6 1975

Inventors:
Dimitrios M. Speros
Robert M. Caldwell
Robert H. Springer
Robert P. Taylor
by Ernest W. Legree
Their Attorney

TIN CHLORIDE MOLECULAR RADIATION LAMP

CROSS-REFERENCES TO RELATED APPLICATIONS

Application Ser. No. 825,722 filed May 19, 1969 by D. M. Speros, R. M. Caldwell and W. E. Smyser entitled "Metal Halide Discharge Lamp" and similarly assigned and now abandoned.

BACKGROUND OF THE INVENTION

The invention relates to a high intensity arc discharge lamp of the molecular radiation type containing a filling of stannous chloride $SnCl_2$, excess tin, and stannous iodide $SnI_2$ along with mercury which serves as a buffer gas and an inert gas such as argon to facilitate starting. Such a lamp is described in copending application Ser. No. 825,722 filed May 19, 1969 by D. M. Speros, R. M. Caldwell and W. E. Smyser entitled "Metal Halide Discharge Lamp" and assigned to the same assignee as the present invention.

The stannous chloride discharge has a color rendition which is at least equal to that of the stannous bromide discharge and an efficiency which is at least 25% higher. However the use of a metal chloride in an arc discharge presented the problem of the severe attack of the tungsten electrode by chlorine. Such attack was generally of the upgradient type, tungsten being taken from the cooler electrode regions and deposited at the tips which are hotter. This causes rapid necking down of the electrode and its eventual destruction. As described in the aforementioned copending application, the attack of the refractory metal electrodes by chlorine in a stannous chloride discharge can be reduced by a large factor if the total amount of tin in the lamp is greater than the amount necessary to provide one tin atom for every two halogen atoms. This condition is realized by placing excess elemental tin in the lamp envelope.

It was also found desirable to have some stannous iodide $SnI_2$ in the filling in addition to stannous chloride $SnCl_2$. The presence of the iodide further reduced attack upon the electrodes and appeared to enhance regenerative transport cycles which kept the walls clean from tungsten deposits.

The object of this invention is to further improve the tin chloride lamp particularly from the point of view of better maintenance and longer life.

SUMMARY OF THE INVENTION

In accordance with our invention, we have established that in a tin chloride lamp, notwithstanding that traces of oxygen are gettered by excess tin present in the lamp, reactions resulting in the formation of tungsten oxides are thermodynamically feasible. Then, in the presence of traces of chlorine, the formation of volatile oxychlorides is thermodynamically favored and gives rise to certain transport phenomena.

In a vertically operated lamp the convective flow is upward at the center and downward at the walls. Tungsten dioxydichloride $WO_2Cl_2$ volatilizes from the lower electrode, is drawn upward into the arc by convection and decomposes in the arc into tungsten, oxygen, chlorine and possibly other species. Simultaneously with the upward motion due to convection, all of these species experience radical diffusion toward the wall. The lighter atoms achieve more radial displacement and as a result, more oxygen and chlorine diffuse toward the walls than tungsten. Oxygen and chlorine near the wall are drawn downward by the convective flow to repeat the attack on the lower electrode. On the other hand tungsten in the arc undergoes less radial displacement and so tends to deposit at the upper electrode. This is the mechanism of the first oxyhalide cycle which transfers tungsten from the lower to the upper electrode.

Wall blackening takes place in the usual way through evaporation and sputtering of the thoriated tungsten electrode. In addition a transport cycle involving disproportionation of tungsten dichloride to tungsten tetrachloride plus tungsten may deposit tungsten on the walls and cause severe blackening. However, in the presence of traces of oxygen along with traces of halogen which are always present from dissociation of either stannous chloride or stannous iodide, formation of oxyhalides with tungsten previously deposited on the walls occurs. This reaction forms a second oxyhalide cycle which removes tungsten from the walls and returns it to the upper electrode.

In accordance with our invention, we have found that for these oxyhalide cycles to operate beneficially, there should exist in the lamp sufficient oxygen for the operation of the second oxyhalide cylce which results in wall cleanup, but not enough for excessive electrode attack through the operation of the first oxyhalide cycle. Ideally what this implies is that the rate of oxyhalide formation at the walls should be balanced by the rate of arrival of tungsten through the processes which would result in wall blackening. The residual oxygen level permissible in a given lamp depends upon the chlorine to iodine ratio and upon the total quantity of tin in the lamp, that is whether a large or small excess is present. For practical lamps wherein the chlorine to iodine atom ratio is less than two, the maximum oxygen content which may be tolerated is about $2 \times 10^{-7}$ gram atoms per cc. A preferred maximum oxygen level for a reasonably long-lived lamp is $2 \times 10^{-8}$ gram atoms per cc. In practice we have found it desirable to aim for as low an oxygen level as can be achieved using the precautions to be described herein and this target level has been not over about $6 \times 10^{-9}$ gram atoms of residual oxygen per cubic centimeter of lamp volume.

DETAILED DESCRIPTION OF INVENTION

Lamp Structure

Figure 1:
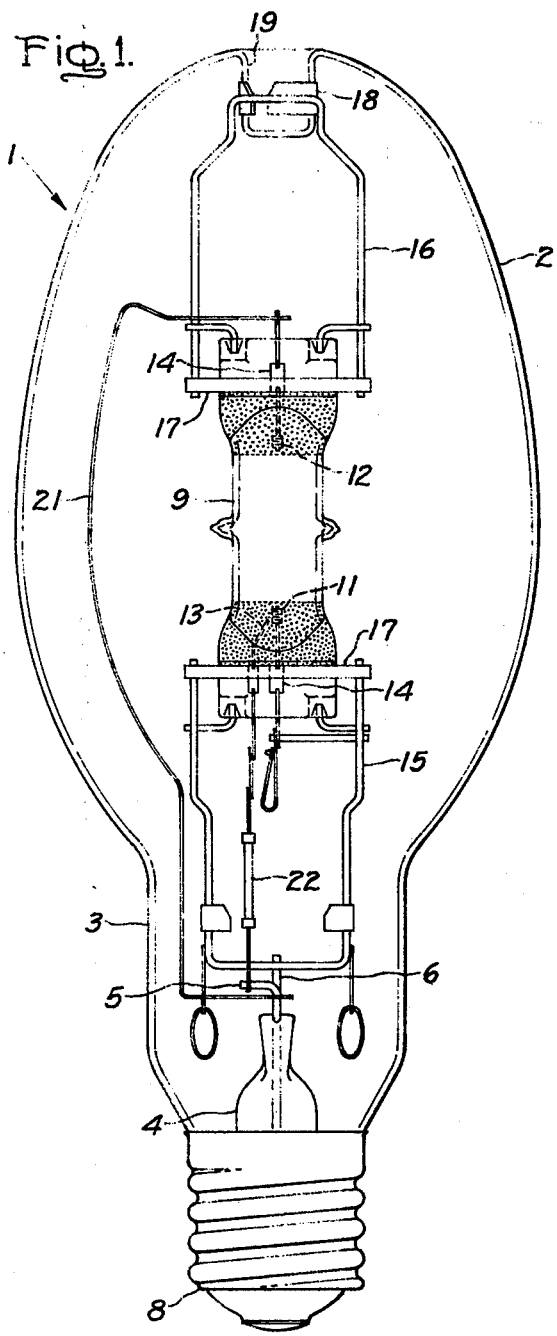
FIG. 1 illustrates a jacketed high intensity lamp embodying the invention.

Referring to FIG. 1, a tin chloride vapor arc lamp 1 in which the invention may be embodied comprises an outer vitreous envelope or jacket 2 of ellipsoidal form having a neck portion 3. The neck is closed by a reentrant stem 4 through which extend stiff inlead wires 5,6 connected at their outer ends to the contacts of a screwbase 8 and at their inner ends to the inner arc tube 9.

The inner arc tube is made of quartz-like glass or fused silica and has sealed therein at opposite ends main arcing electrodes 11,12 plus an auxiliary starting electrode 13. The electrodes are supported on inleads which include intermediate thin molybdenum foil sections 14 hermetically sealed through the flattend or pinched ends of the arc tube. The main electrodes 11,12 each comprise a double layer helix of tungsten wire wrapped around a thoriated tungsten core.

The arc tube is supported within the outer jacket by a divided or two-part mount, 15 at the base end and 16 at the dome end. Each part comprises a pair of longitudinally extending support rods bridged by metal straps 17 which clamp about the pinched ends of the arc tube. The base end mount part is welded to inlead 6 and serves as a conductor to main electrode 11. The dome end mount part has attached thereto a springy collar 18 which engages a reentrant nipple 19 in the dome end of the jacket. Main electrode 12 is connected to inlead 5 by curving wire 21. Starting electrode 13 is connected to inlead 5 through current limiting resistor 22. A thermal switch 23 consisting of a bimetal is arranged to short-circuit auxiliary electrode 13 to main electrode 11 after the lamp warms up.

The arc tube contains argon at a low pressure, a quantity of mercury substantially vaporized during operation and exerting a partial pressure of 1 to 15 atmospheres, and stannous chloride, stannous iodide and tin. It may be more convenient to introduce the filling as tin, mercury chloride and mercury iodide. By way of example in one lamp of 400 watt rating wherein the arc tube had an overall body length of about 8 cm. and a volume of about 15 cc., the fill was 31 mg Hg, 6.15 mg $HgCl_2$, 10.2 mg $HgI_2$, 15 mg Sn, and Ar at 25 torr.

Thermodynamic Analysis of the Effects of Metal Oxides

Our invention is explainable by thermodynamic analysis of the effects of metal oxides and particularly stannous oxide SnO which will form in the presence of oxygen containing impurities. Sources of oxygen in a lamp are oxide impurities in the halides introduced into the lamps, oxygen and water vapor due to poor lamp exhaust or evolution from the quartz surface of insufficiently degassed arc tubes. Also a major source of SnO is the oxide film which forms in air on the tin powder introduced into the lamp and which may be observed as a layer on a liquid pool or on droplets of heated tin.

In the presence of stannous oxide, the formation of tungsten oxides is thermodynamically favored by either solid-solid, or solid-gas processes.

An example of a solid-solid process is the reaction of SnO in contact with W to produce tungsten dioxide $WO_2$ follows:

$$2\ SnO(s) + W(s) \rightarrow WO_2(s,g) + 2Sn(l) \qquad (1)$$

An example of a solid-gas process is as follows: Even in the presence of Sn and under conditions of local thermodynamic equilibrium, small amounts of free $Cl_2$ and Cl exist in the lamp. In the presence of SnO, small amounts of oxygen will form through the following reactions:

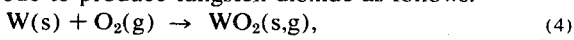

The oxygen formed can react with the tungsten electrode to produce tungsten dioxide as follows:

$$W(s) + O_2(g) \rightarrow WO_2(s,g), \qquad (4)$$

in which case the equilibria of reactions (2) and (3) will shift to the right to produce more oxygen.

Another process is that due to vaporization of SnO:
$$SnO(s) \rightleftarrows SnO(g), \qquad (5)$$
with the subsequent interaction:
$$2SnO(g) + W(s) \rightarrow WO_2(s,g) + 2Sn(l). \qquad (1A)$$
Yet another process is that due to the dissociation of SnO:
$$2SnO(s,g) \rightarrow 2Sn(l) + O_2(g). \qquad (6)$$

Although the equilibrium pressure of $O_2$ from reaction (6) is only of the order of $10^{-20}$ atm. at 1000°K, its reaction with W previously indicated under (4) would shift the equilibrium to the right.

As will be seen, because of a cycling action, only small amounts of $WO_2$ are necessary to cause electrode attack, and therefore no process can be disregarded.

Once a tungsten oxide $W_xO_y$ is formed, volatile tungsten dioxydichloride, $WO_2Cl_2$, has a large thermodynamic and kinetic tendency to form because of the existence of small amounts of $Cl_2$ and Cl in the lamp, as follows:

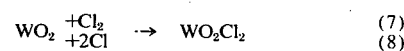

Transport Mechanism—First Oxyhalide Cycle

Figure 4:
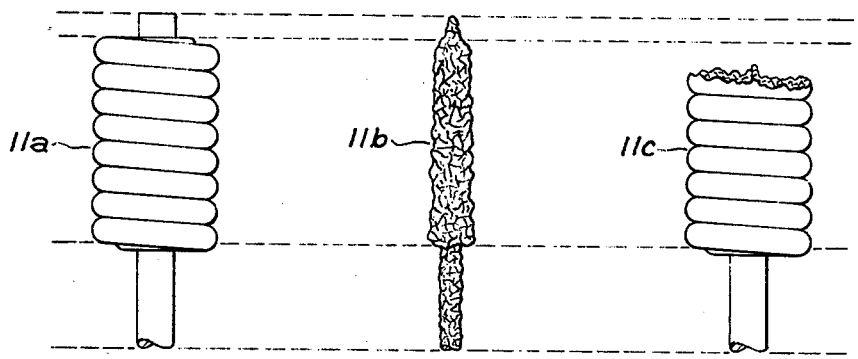
FIG. 4 shows enlarged views of the lamp electrode at various stages of attack.

The reactions given above, culminating with reactions (7) and (8), result in the "erosion" of the electrode. Erosion occurs at the lower electrode 11 of a vertically operating lamp which acquires the appearance shown at 11b in FIG. 4, the normal appearance of the electrode being shown at 11a. The attack on the electrode is generalized and neither hotter nor cooler electrode regions are favored.

Figure 3:
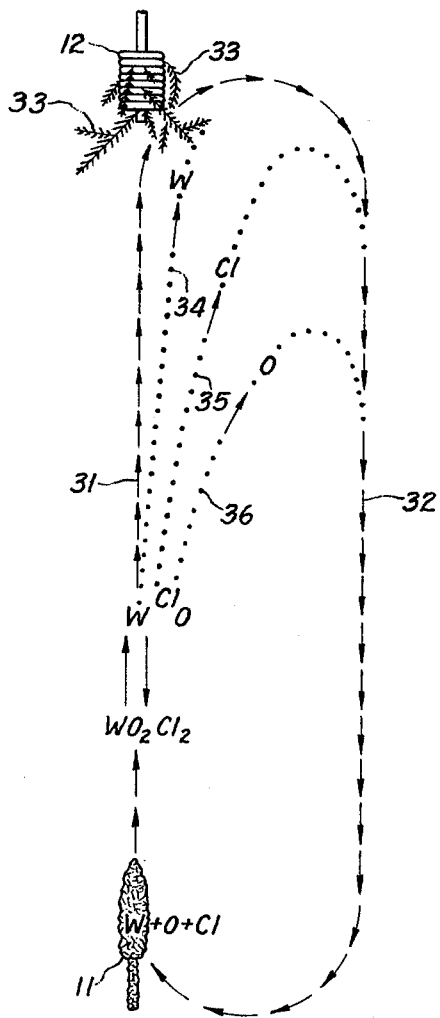
FIG. 3 is a convection diagram providing a simplified picture of the movement of the various atoms and molecules in the lamp.

Convection currents in the lamp cause vapors to flow upwards in the hot region along the axis between electrodes 11 and 12, and downward along the cooler walls. The upward flow at the axis is represented schematically by the arrows 31 in FIG. 3, and the downward flow at the walls by the arrows 32. Some of the $WO_2Cl_2$ is drawn into the hot axial region of the arc. There the oxyhalide decomposes partially or completely, as confirmed by spectroscopic detection of atomic tungsten in the arc. Such tungsten eventually arrives in the vicinity of the upper electrode 12. Assuming that the tungsten of the upper electrode is in local thermodynamic equilibrium with its own vapor, the arrival of W from the oxyhalide will lead to supersaturation and condensation. This is observed as dendritic tungsten crystals 33 growing on the upper electrode 12 which continue to grow as the lower electrode 11 is consumed.

The return or retrograde part of the cycle poses the question: since in addition to W, oxygen and chlorine dissociation species must form in the arc and also arrive at the upper electrode, why is the reaction not reversed with erosion of the upper electrode and reforming of $WO_2Cl_2$. The explanation resides in the effect of lateral or radial diffusion of the dissociation species across the arc toward the walls superimposed on their upward motion due to convection. The atomic masses and radii of W, Cl and O differ considerably, being 184, 35, and 16 respectively. Therefore their radial diffusion rates (through Hg vapor primarily) differ considerably being greatest for oxygen and least for tungsten. The composite motion of each type of atom due to both convection and diffusion from a given point along the arc may be represented schematically by dotted lines 34, 35 and 36 in FIG. 3. The result is that less oxygen and chlorine arrive at the upper than at the lower electrode. Hence erosion takes place at the lower electrode and tungsten deposition at the upper electrode. The net result is a cycle gradually transporting tungsten from the lower to the upper electrode.

Wall Blackening — Transport Cycle

In any discharge lamp, some wall blackening results from sputtering of the electrodes at starting and normal evaporation during operation. This is all the more to be expected where the electrodes do not contain electron emitting powders and consist of thoriated tungsten.

Figure 2:
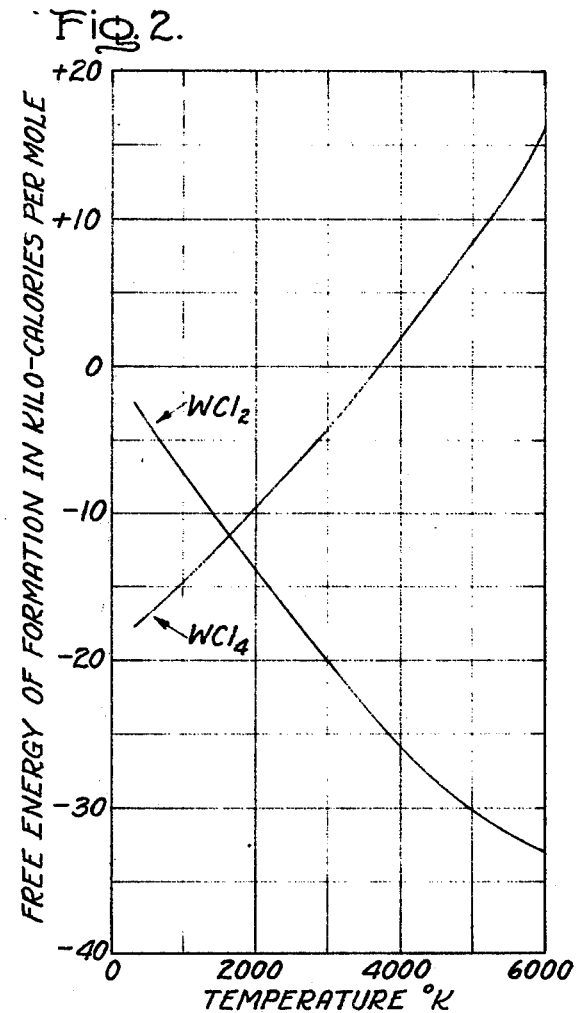
FIG. 2 shows the free energy curves for $WCl_2$ and $WCl_4$.

Thermodynamic considerations and experimental observations indicate that, in addition to the above normal causes, a transport cycle can operate in the lamp that will cause severe blackening. Referring to FIG. 2, the two curves depict existing thermodynamic data for the formation of $WCl_2$ and $WCl_4$ (JANAF tables). A more negative free energy of formation indicates greater stability. Therefore the data indicate that at higher temperatures, the dichloride $WCl_2$ is the stable specie, while at lower temperatures, the tetrachloride $WCl_4$ is more stable. Therefore it can be expected on thermodynamic grounds that the dichloride will disproportionate into the tetrachloride and tungsten at lower temperatures, as follows:

$$2WCl_2 \underset{\text{High T}}{\overset{\text{Low T}}{\rightleftarrows}} W + WCl_4. \qquad (9)$$

It is also seen that the direct attack of tungsten by chlorine to form $WCl_2$ is more favored thermodynamically at higher temperatures. This is supported by experimental observation: in lamps in which the oxygen content has been kept low, attack of the electrode occurs slowly at the hottest place, that is at the tip where the arc attaches as shown by electrode 11c in FIG. 4. It is therefore possible at elevated temperatures for the reaction $$W + 2Cl \rightarrow WCl_2 \qquad (10)$$

to occur, limited only by the mass action law (partial pressure of Cl) and the kinetic reaction rate. However reaction (10) need not be the cause, or the sole cause of the formation of $WCl_2$. It is also produced by the thermal decomposition of $WO_2Cl_2$ which occurs during the first oxyhalide cycle.

As seen in FIG. 2, $WCl_2$ is highly stable even at arc temperatures from 4000° to 6000K°. However after diffusion to the walls where the temperature is below 1600°K, $WCl_2$ is no longer stable and disproportionates to $WCl_4$ with deposition of W which causes wall blackening (reaction 9 proceeds from left to right). By convection, the $WCl_4$ formed will be recycled and, on meeting the electrodes, will remove W to reform $WCl_2$ (reaction 9 now proceeding from right to left).

Wall Clean Up—Second Oxyhalide Cycle

The rate of formation and evaporation of $WO_2Cl_2$ at wall temperatures is small but finite, and this is also the case for the formation and evaporation of $WO_2I_2$.

Thus in the presence of oxygen—traces of halogen always being present from halide dissociation—the formation of the oxyhalides with W at the walls and their subsequent evaporation can be expected, the reactions being as follows:

$$W \text{ (at wall)} + 2O + 2Cl \rightarrow WO_2Cl_2 \qquad (11)$$

and $$W \text{ (at wall)} + 2O + 2I \rightarrow WO_2I_2 \qquad (12)$$

These oxyhalide species, through convection, are drawn downward and eventually come in contact with the lower electrode. No reaction with the tungsten electrode occurs and these species as such do not lead to electrode attack. However they are next carried upward through the arc and some decomposition into W, Cl and O thereupon occurs as in the first oxyhalide cycle. Some W is deposited on the upper electrode and oxygen diffuses to the wall for a repetition of the clean up process. Some decomposition of oxyhalide, particularly $WO_2I_2$ at the lower electrode is likely and constitutes a restorative process.

Oxygen Level

The foregoing leads to the important conclusion that for the oxyhalide cycles to operate beneficially, there should exist in the lamp sufficient oxygen for the operation of the second oxyhalide cycle which results in wall clean up, but not enough for excessive electrode attack through the operation of the first oxyhalide cycle. Ideally the rate of arrival of tungsten through the processes described above under wall blackening should be precisely balanced by the rate of oxyhalide formation at the wall.

The theoretical calculation of the optimum amount of oxygen that must be present to achieve this condition is very difficult. The effect of various levels of residual oxygen has been determined experimentally. Oxygen was reduced below the levels commonly tolerated in lamp making by using special care during lamp processing and by resorting to the following practices. The tin powder was heated to the melting point in dry nitrogen and the oxide film floating on the liquid surface was decanted. Only the pure metal characterized by a shiny surface was used in lamp making. The mercury chlorides and iodides were vacuum distilled and only the distillate used in making lamps. In addition lamps were made using vacuum-baked quartz arc tubes.

Table 1 summarizes the results of tests on a large number (in excess of 60) lamps utilizing arc tubes of 15 c.c. volume of the kind illustrated in FIG. 1. Four series of lamps were made wherein the residual oxygen level was reduced by a factor of about 3.8 between series. Within each series the chlorine to iodine atomic ratio was varied from 0.5 to in excess of 3. Not all lamps fell precisely within the column headings and some of the results were obtained by interpolation or projection. Lamp life is determined substantially by the life of the electrodes and is reported in hours under that heading. The symbol "G" indicates that the electrode attack is general throughout its surface area, while the symbol "H" indicates that the attack is at the hot-test part of the electrode only; the symbol "S" indicates slight attack only.

TABLE I

| Residual Oxygen Level | $1.66 \times 10^{-7}$ gm. atoms/cc | | | $4.16 \times 10^{-8}$ gm. atoms/cc | | |
|---|---|---|---|---|---|---|
| Cl/I Ratio | Wall Condition | Lamp Life (hrs.) | Nature of Electrode Attack | Wall Condition | Lamp Life (hrs.) | Nature of Electrode Attack |
| 0.5 | Clean | 70 | G | Clean | 600 | G |
| 1 | Clean | 10 | G | Clean | 300 | G |
| 2 | Clean | 5 | G | Clean | 100 | G |
| 3 or greater | Black | 1 | G | Black | 10 | G |

TABLE I-Continued

| | Residual Oxygen Level: $1.25 \times 10^{-8}$ gm. atoms/cc | | | $3.12 \times 10^{-9}$ gm. atoms/cc | | |
|---|---|---|---|---|---|---|
| Cl/I Ratio | Wall Condition | Lamp Life (hrs.) | Nature of Electrode Attack | Wall Condition | Lamp Life (hrs.) | Nature of Electrode Attack |
| 0.5 | Clean | 3000 | G | Clean | 5000 | S |
| 1 | Clean | 1500 | G | Clean | 2000 | S |
| 2 | Clean | 1000 | G-H | Clean | 1000 | H |
| 3 or greater | Black | 75 | G-H | Black | 100 | H |

It was found that the breakdown voltage of all lamps utilizing a chlorine to iodine atom ratio of approximately 2 or less was 300 volts or less. This represents a substantial reduction from prior unimproved tin halide lamps and permits ballasting by standard components such as used in commercially produced mercury vapor or metal halide lamps.

The most important quantities obtained from the table are the upper limits for the oxygen content, namely $1.66 \times 10^{-7}$ gram atoms per c.c. which may be rounded off to $2 \times 10^{-7}$ gram atoms/c.c., and an upper Cl/I atom ratio of approximately 2. It is seen that this level of residual oxygen will keep the walls clean through the operation of the second oxyhalide cycle. However the electrode attack due to operation of the first oxyhalide cycle is general and rather severe resulting in short lamp lives of 5, 10 and 70 hours for Cl/I atom ratios of 2, 1 and 0.5 respectively.

As the oxygen level is decreased, the walls remain clean through the operation of the second oxyhalide cycle, and severity of electrode attack by reason of the operation of the first oxyhalide cycle decreases. For a residual oxygen level of $3.12 \times 10^{-9}$ gram atoms/cc, Cl/I atoms ratios of 2, 1 and 0.5 result in lamp lives of greater than 1000 hours, 2000 hours and 5000 hours respectively, and the electrode attack is slight or confined to the hottest part. Thus the table indicates that for a practical lamp it is desirable to reduce the oxygen level to the point where the attack on the electrodes will permit a lamp life within commercially acceptable limits.

While it is readily seen from the table that going to a lower Cl/I ratio gives longer life, this advantage is at the same time burdened by lower efficiency and entails lower color temperature. By altering the Cl/I ratio, the mercury pressure, and the total halide pressure, color temperatures from 4000°K to 6000°K can be obtained. Typically with a Cl/I ratio of 1.0, a color temperature of about 5500°K is obtained with an efficacy of 65 lumens per watt.

The life duration required for a commercially acceptable lamp varies greatly with the intended purpose of the lamp. While a few hours may suffice for photographic applications, several thousand hours are necessary for general lighting purposes. We have found that lamps of practical merit require a residual oxygen level not in excess of approximately $2 \times 10^{-7}$ gram atoms per c.c. and a Cl/I ratio not in excess of approximately 2.

In lamps having lives of at least 1000 hours and suitable for various general lighting applications, a preferred range of residual oxygen is not over approximately $2 \times 10^{-8}$ gram atoms per c.c. For reasonably high efficiency and good color, the preferred chlorine to iodine atom ratio is between 2 and 0.5.

A preferred design for a lamp having a life of several thousand hours is a chlorine to iodine atom ratio between 0.5 and 1 and a residual oxygen level not over 6 $\times 10^{-9}$ gram atoms per cubic centimeter of lamp volume. This residual oxygen level is a practical one that can be achieved in lamp manufacture by using the techniques and precautions earlier described herein.

What we claim as new and desire to secure by Letters Patent of the United States is:

1. A high intensity arc lamp comprising a light transmissive envelope of a material non-reactive with stannous chloride at an elevated temperature, refractory metal sealed into the ends thereof and a filling within said envelope comprising stannous chloride, stannous iodide and tin, a quantity of mercury which is substantially all vaporized during operation, and an inert gas to facilitate starting, the atom ratio of chlorine to iodine within said envelope being not in excess of approximately two and the maximum residual oxygen content being low enough to prevent excessive electrode attack by one oxyhalide transport cycle while permitting wall cleanup by another oxyhalide transport cycle.

2. A lamp as in claim 1 wherein the refractory metal is primarily tungsten.

3. A high intensity arc lamp comprising a light transmissive envelope of a material non-reactive with stannous chloride at an elevated temperature, refractory metal electrodes sealed into the ends thereof and a filling within said envelope comprising stannous chloride, stannous iodide and tin, a quantity of mercury which is substantially all vaporized during operation, and an inert gas to facilitate starting, the atom ratio of chlorine to iodine within said envelope being not in excess of approximately two and the maximum residual oxygen content being not in excess of $2 \times 10^{-7}$ gram atoms per cubic centimeter of lamp volume.

4. A lamp as in claim 3 wherein the refractory metal is primarily tungsten.

5. A lamp as in claim 3 wherein the maximum residual oxygen content is not over $2 \times 10^{-8}$ gram atoms per cubic centimeter of lamp volume.

6. A lamp as in claim 5 wherein the refractory metal is primarily tungsten.

7. A lamp as in claim 3 wherein the chlorine to iodine atom ratio is between 2 and 0.5 and wherein the maximum residual oxygen level is not over $2 \times 10^{-8}$ gram atoms per cubic centimeter of lamp volume.

8. A lamp as in claim 7 wherein the refractory metal is primarily tungsten.

9. A lamp as in claim 3 wherein the chlorine to iodine atom ratio is between 1 and 0.5 and wherein the maximum residual oxygen level is not over $6 \times 10^{-9}$ gram atoms per cubic centimeter of lamp volume.

10. A lamp as in claim 9 wherein the refractory metal is primarily tungsten.

* * * * *